United States Patent
Thorud

[15] 3,649,997
[45] Mar. 21, 1972

[54] FOLDING HANDLE LATCH

[72] Inventor: Richard A. Thorud, Minneapolis, Minn.
[73] Assignee: Toro Manufacturing Corporation, Minneapolis, Minn.
[22] Filed: Aug. 22, 1969
[21] Appl. No.: 852,296

[52] U.S. Cl. .............................16/111, 24/201 SL, 280/47
[51] Int. Cl. ..................A47b 95/02, A47j 45/00, B62b 1/08
[58] Field of Search ................16/110 T; 280/47; 287/20 T, 287/90; 248/354 T; 24/201 SL, 201 S; 85/5 T

[56] References Cited

UNITED STATES PATENTS

| | | | |
|---|---|---|---|
| 1,107,881 | 8/1914 | Berntsen | 85/5 CP |
| 1,803,431 | 5/1931 | Hill | 85/5 R X |
| 1,834,690 | 12/1931 | Dolan et al. | 24/201 SL |
| 3,462,924 | 8/1969 | Price et al. | 16/111 X |
| 2,389,811 | 11/1945 | Ozlek | 287/99 |
| 2,758,847 | 8/1956 | Shone | 287/47.37 UX |

FOREIGN PATENTS OR APPLICATIONS 186,986 10/1922 Great Britain.........................280/47

*Primary Examiner*—Paul R. Gilliam
*Attorney*—Vernon A. Johnson and Thomas A. Lennon

[57] ABSTRACT

A folding steering handle for a rotary mower, the handle being attached to the rear of the mower and extending upwardly and rearwardly therefrom. The handle consists of a lower section and an upper section pivotally attached thereto, said upper section being capable of being swung forwardly from an upright operating position to a lowered generally horizontal position over the mower housing. Releasable latch mechanism is provided for holding the upper handle section in an upright operative position. This latch mechanism comprises a latch pin which seats in aligned openings in the frame structure of the upper and lower handle sections, said latch pin being held in position and manipulated by a handle attached thereto which is formed of spring wire which biases the pin toward latching position.

5 Claims, 6 Drawing Figures

PATENTED MAR 21 1972　　3,649,997
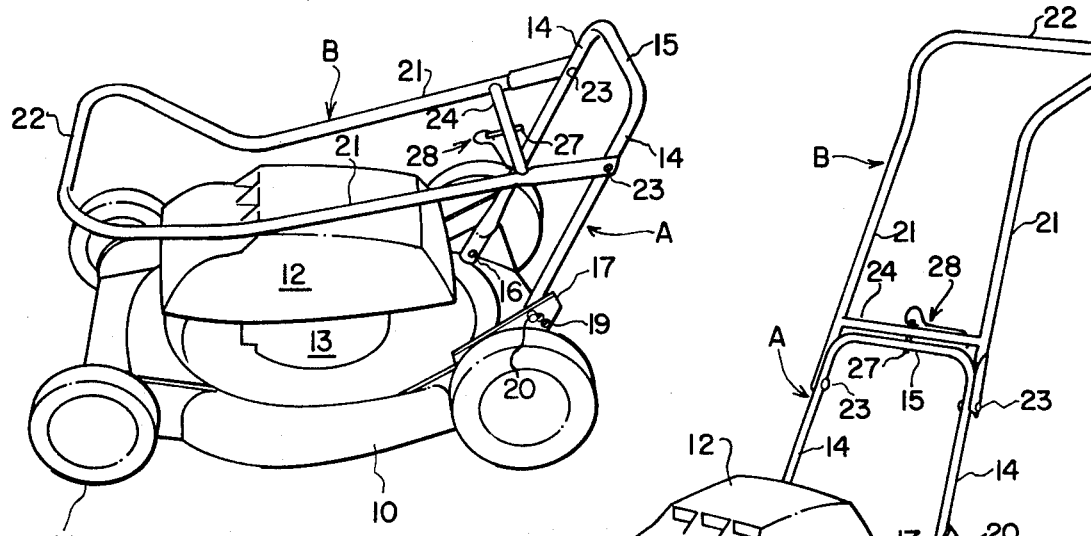
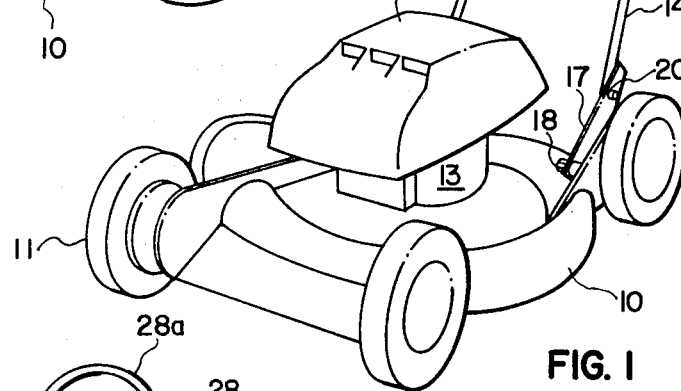
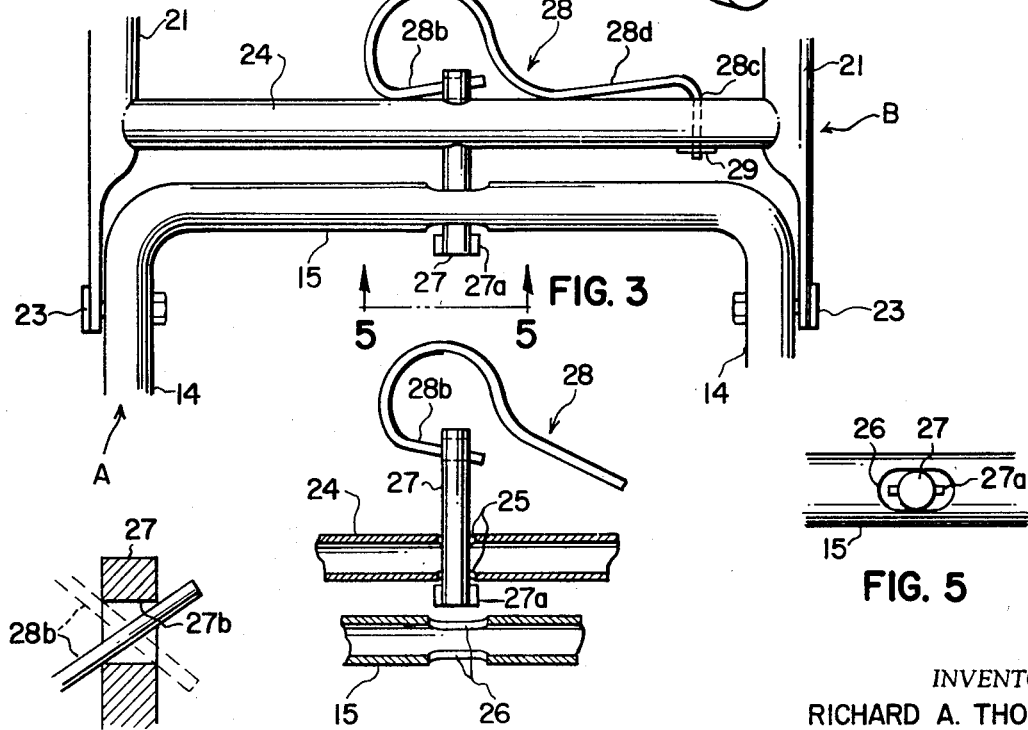
INVENTOR.
RICHARD A. THORUD
By THOMAS A. LENNON
*Attorney*

3,649,997

1

FOLDING HANDLE LATCH

Most rotary mowers are provided with a rigid unitary steering handle which cannot be collapsed or folded. Because of this, the mower requires a considerable amount of space to store same, and it is difficult and sometimes impossible to conveniently transport same from place to place such as in the trunk of an automobile.

Some collapsible handle structures have been designed to solve the problem. However, to date most of the efforts have not been as successful as might be desired either because of the complexity of the design and the number of movements and operations required, and/or because of the type of mechanism provided to hold the parts of the handle in the desired operative position.

Therefore, an important object of the invention is to provide a folding handle for a rotary mower which is simple and uncomplicated in design and operation, and which can be conveniently collapsed and folded into a compact folded condition which will enable the mower to be stored in a substantially smaller space than has heretofore been possible and which enables the mower to be transported in the trunk of a car with the trunk lid closed.

Another important object of this invention is to provide a simple, inexpensive, easy-to-operate latch mechanism for the collapsible handle which enables the operator to virtually instantaneously assemble the folded sections in the connected operative upright position.

These and other objects and advantages will appear and be apparent from the following description and drawings accompanying same in which:

FIG. 1 is a left front perspective view of a rotary mower embodying the novel folding handle and latch mechanism of this invention, with the steering handle in upright operative position;

FIG. 2 is a left side perspective view of FIG. 1 with the handle in collapsed folded position;

FIG. 3 is an enlarged front detail of the latch mechanism when the handle sections are locked together in operative position, and;

FIG. 4 is a view similar to FIG. 3 showing the latch mechanism in unlocked condition just prior to connecting the handle sections together in operative position or just prior to folding the handles from operative position, with portions broken away;

FIG. 5 is a bottom plan view taken approximately along the line 5—5 of FIG. 3;

FIG. 6 is an enlarged sectional view of the latch pin and the portion of the latch handle connected therewith.

Referring to the drawings, the mower illustrated in FIGS. 1 and 2 is, except for the novel handle and latch mechanism, a basically conventional rotary mower design which includes a housing 10 which has enclosed therewithin a horizontal cutting blade (not shown), ground wheels 11, and the shroud 12 covering the top of the engine 13.

The steering handle structure comprises a lower handle section A and an upper handle section B, both of which are of generally inverted U-shaped configuration. The lower handle section A is formed of an integral length of tubing which is bent and shaped so as to provide a pair of opposed depending leg portions 14 which are interconnected at their upper ends by a transverse bight portion 15. The lower ends of legs 14 are pivotally connected to the rear end portion of the housing 10 by means of pins 16. To maintain the handle in the desired angular position, a handle bracket 17 is provided for legs 14. These brackets are pivotally attached to the mower housing at 18. Each of the brackets 17 is provided with a plurality of holes 19 which are adapted to selectively receive side pins 20 which extend laterally from the outer side of each leg 14. Thus, the brackets hold the handle structure in the desired upright position.

The upper handle section B is also formed of a single integral length of tubing which is bent and shaped to provide a pair of depending legs 21 which are connected at their upper ends by a cross member or bight portion 22 which serves as a handle grip which the operator holds during use. The legs 21 are pivotally connected at their lower ends to the upper end portion of the legs 14 and to the lower handle section A by means of pivot bolts 23.

Thus, the upper handle section B can be swung relative to the lower handle section A by pivoting it on the bolts 23 from the upright operative position of FIG. 1 to the folded collapsed position of FIG. 2, in which position the upper handle section overlies the housing.

In order to maintain the upper handle section B in the upright operative position, the simple, easy to operate latch mechanism of this invention is provided. As part of the latch structure, the cross bar 24 is provided on the upper handle B which extends between the legs 21 and is rigidly attached thereto. In the upright operative position, this cross bar 24 is parallel to and in slightly spaced relationship with the cross bar 15 of the lower handle section. Openings 25 and 26 are provided in the cross members 24 and 15 respectively, which openings are in alignment with one another when the upper handle section is in operative position. An elongate cylindrical latch pin 27 is provided which is installed in said openings and axially or longitudinally movable relative thereto.

To operate the latch pin and maintain it in the desired position, a latch handle 28 is provided. This latch handle is formed of an integral length of spring wire or rod. One end of the handle is an enlarged loop portion 28a which is of such size and shape as to conveniently receive the finger of the operator. The free end portion 28b of the looped end of the wire is installed in a transverse bore or opening in the upper end of the latch pin. The latch handle is mounted on cross bar 24 by means of offset end 28c of the latch handle, which offset end is installed in a transverse bore or opening in one end of the cross bar 24, and held in place by a lock washer 29.

The latch pin 27 is shown in FIGS. 1 and 3 extending between the cross bars 15 and 24 and maintaining the two handle sections locked together in operative position. The latch handle 28 biases the pin 27 downwardly towards locking engagement with cross bar 15.

In order to fold the upper handle section, the operator inserts his finger in the loop 28a and pulls upwardly against the tension of the spring wire of the latch handle, until the latch pin 27 is free of the cross bar 15 in the approximate position illustrated in 4. The upper handle section is then free to move and the operator simply pushes the upper handle section B forwardly to the folded position of FIG. 2.

To assemble the upper handle section in operative position the handle is swung upwardly from the folded position of FIG. 2 until the latch pin openings 25 and 26 are in alignment with one another where upon the latch pin is again installed in the openings 25 and 26 and the handle sections are again aligned together in operative position.

Thus, in a single simple easy movement involving pulling upwardly on the looped latch handle portion 28a, the handle sections A and B can be conveniently locked together or unlocked.

It will also be noted that the illustrated and described folding handle structure does not require any movement or manipulation of the lower handle section A, which can remain in its normal operative position for most purposes when the upper section B is collapsed, as illustrated in FIG. 2. The upper section B is the longer of the two sections, and its length substantially corresponds to the length of the mower proper, and is connected to the lower section in such manner that when it is folded down on the mower, the overall length of the collapsed unit is not increased, that is, it lies essentially within the length-wise limits of the mower absent the upper section B.

The latch mechanism is located at a convenient height whereby the average person can, by slightly bending over, reach the loop portion 28a from a standing position behind the handle grip 22.

It will also be noted that when the handle is collapsed, the overall height of the unit is materially reduced.

The latch handle 28 constitutes a cantilever type spring which biases the latch pin 27 downwardly towards handle locking position. The looped portion 28a is in substantial alignment with the pin 27 and overlaps the upper end thereof, whereby the finger pull is in substantial alignment with the pin. The looped portion 28a is connected with the offset anchoring end portion 28c by means of a straight intermediate portion 28d, which intermediate portion 28d is in substantially longitudinal axial alignment with the end portion 28b attached to the pin.

It will also be understood that although the invention has been described as applied to a rotary mower, it is not necessarily limited thereto. The folding handle structure and latch mechanism may be applied to any product where a folding handle is desirable, and the latch mechanism per se can be applied to any structure where it is desirable to releasably lock two parts together.

To prevent latch pin 27 from being pulled completely out of cross bar 24 and becoming disengaged therefrom, a pair of detents or tabs 27a are provided on the lower end of pin 27. These detents extend laterally from diametrically opposite sides of the pin and are oriented longitudinally of the cross bar 15.

To permit free passage of the detents through cross bar 15, the openings 26 thereof are elliptically shaped, with the long axis thereof extending longitudinally of bar 15 to accommodate the detents. The circular openings 25 and the short transverse axis of openings 26 are only slightly larger in diameter than pin 27 to provide a close free sliding fit therebetween, to prevent any significant transverse play or rattling between the handle sections when they are locked together in operative position.

The detents 27a are incapable of passing through the openings 25 in cross bar 24. Therefor, if the pin 27 is pulled upwardly far enough, the detents 27a will engage the underside of bar 24, and thereby prevent further upward movement of pin 27 and removal of pin 27 from openings 25.

The bore 27b of latch pin 27 which receives the end portion 28b of the latch handle is sufficiently larger in diameter than the portion 28b of the latch handle to enable portion 28b to shift its angular attitude relative to latch pin 27 as the pin moves up and down. This prevents the pin 27 from binding or sticking in the cross bars, and permits it to slide freely up and down relative thereto.

This play between the latch pin and latch handle is illustrated in FIG. 6, wherein the upwardly inclined solid line position of handle portion 28b represents its position and attitude when the pin is in the locking position of FIG. 3. The downwardly inclined broken line position of handle portion 28b in FIG. 6 represents its position and attitude relative to the pin when the pin is in the unlocked position of FIG. 4.

The latch handle portions 28b and 28d rest against and engage the cross bar 24 in locking position and serve to stop the downward travel of the latch pin when it is in the desired locking position.

The latch handle is tensioned or preload in the locked position of FIG. 3.

It will, of course, be understood that various changes may be made in the form, details, arrangement and proportion of the various parts without departing from the scope of the invention.

What is claimed is:

1. A collapsible handle comprising in combination:
   a. a lower handle section adapted to be connected to a ground transversing machine, said lower handle section including at least one structural portion having a pin receiving first opening therethrough;
   b. an upper handle section pivotally connected to said lower handle section for movement between an upright operating position to a lowered generally horizontal position, said upper handle section including at least one structural portion having a pin receiving second opening therethrough in alignment with said first opening when said upper handle section is in said upright position.
   c. an elongated latch pin extending longitudinally through said second opening and adapted to extend through both said first and second openings, when said upper handle section is in the upward operating position, to restrain movement between said upper and lower handle sections, said pin having a cross-sectional area slightly less than the area of said second opening; and
   d. an elongated cantilever type spring rod having one end secured to said upper handle section and the other end connected adjacent to one end of said latch pin to biasly retain said pin within both said first and second openings.

2. A collapsible handle according to claim 1 wherein said spring rod is bent to form a loop capable of receiving a finger of an operator, said loop in substantial alignment with the longitudinal direction of movement of said elongated latch pin within said first and second openings.

3. A collapsible handle according to claim 2 wherein:
   a. said latch pin includes at least one detent laterally extending from said pin, said detent located adjacent the end of said pin opposite the end connected to said spring rod; and wherein
   b. the area of said first opening is greater than the combined cross-sectional area of said pin and detent to allow said detent to pass therethrough without substantial interference, and the area of said second opening is less than the combined cross-sectional area of said pin and detent to prevent said pin from being removed from said upper handle section.

4. A collapsible handle according to claim 1 wherein:
   a. said lower handle section comprises two spaced apart lower legs adapted to be connected to the ground transversing machine at the lower ends thereof and a first transverse member adjacent the upper end of said lower handle section, said first transverse member including said first opening therethrough, and wherein
   b. said upper handle section comprises two spaced apart upper legs each pivotally connected adjacent the lower end thereof to separate said lower legs, said upper upper handle section including a second transverse member adjacent the lower end of said upper handle section and adjacent to said first transverse member, said second transverse member including said second opening therethrough.

5. A collapsible handle according to claim 4 wherein said spring rod comprises said one end secured to said second transverse member and a loop adjacent said other end capable of receiving a finger of an operator, said loop in substantial alignment with the longitudinal direction of movement of said elongated latch pin whereby the operator may readily move said latch pin within said pin receiving first and second openings.

* * * * *